United States Patent [19]
Frick et al.

[11] 4,332,429
[45] Jun. 1, 1982

[54] HOUSEHOLD REFRIGERATOR AND METHOD OF CONSTRUCTION

[75] Inventors: William C. Frick, Louisville, Ky.; John M. Powell, Charlestown, Ind.

[73] Assignee: General Electric Company, Louisville, Ky.

[21] Appl. No.: 99,286

[22] Filed: Dec. 3, 1979

[51] Int. Cl.³ .................. A47B 77/08; H02G 3/00; F25D 23/08
[52] U.S. Cl. .................. 312/236; 312/214; 174/48; 174/72 C; 29/526 R
[58] Field of Search ............. 312/236, 214; 29/526 R; 174/48, 70 C, 72 C, 97; 16/2, 16

[56] References Cited
U.S. PATENT DOCUMENTS

| | | | |
|---|---|---|---|
| 1,719,609 | 7/1929 | Houts | 248/49 |
| 2,295,444 | 9/1942 | Woodward | 16/16 |
| 2,958,210 | 11/1960 | Rill, Jr. | 312/214 |
| 3,211,824 | 10/1965 | Heiman | 174/48 |
| 3,211,825 | 10/1965 | Clos | 174/48 |
| 3,235,944 | 2/1966 | Broske et al. | 29/526 R |
| 3,297,815 | 1/1967 | Drettmann | 174/48 |
| 3,325,128 | 6/1967 | Elleboudt | 174/70 C |
| 3,325,585 | 6/1967 | Brenneman | 174/48 |
| 3,405,986 | 10/1968 | Cannon | 312/214 |
| 3,606,659 | 9/1971 | Robbins | 29/526 R |
| 3,631,644 | 1/1972 | Mazza . | |
| 3,634,608 | 1/1972 | Buhl | 16/2 |
| 3,823,251 | 7/1974 | Heithecker et al. | 174/48 |
| 4,023,758 | 5/1977 | Yuda . | |
| 4,180,297 | 12/1979 | Abrams | 312/236 |
| 4,203,193 | 5/1980 | Arthur | 29/526 R |

Primary Examiner—Victor N. Sakran
Attorney, Agent, or Firm—Frederick P. Weidner; Radford M. Reams

[57] ABSTRACT

A refrigerator cabinet having a rigid plastic foam member and an electrical wiring assembly, and the method of constructing the same. There is provided an open channel in the rigid plastic foam member and electrical wires are placed in the channel. At least one clip is secured within the channel, the clip having two spaced legs with projections formed thereon, and gripping respectively the side walls of the channel. The clip also has a body member depending from the legs spanning the open channel remote from the bottom wall and spaced from the electrical wires to confine and allow longitudinal movement of the wires within the channel.

13 Claims, 5 Drawing Figures

HOUSEHOLD REFRIGERATOR AND METHOD OF CONSTRUCTION

BACKGROUND OF THE INVENTION

This invention relates to household refrigerators and is more particularly concerned with a combination refrigerator cabinet, that is, a refrigerator cabinet including a freezer compartment on top and a fresh food compartment below separated by a partition and the method of making the same.

Combination refrigerators, including a single evaporator and a single fan for circulating air from the freezer and fresh food compartments over the evaporator are well known. In the operation of such refrigerators, a major portion of the refrigerated air from the evaporator is directed into the freezer compartment while a smaller portion is directed into the fresh food compartment. The freezer compartment is maintained at below freezing temperatures, while the fresh food compartment is maintained above the freezing temperature. To separate the two compartments and to help maintain their respective temperature levels, there is provided a partition which, in many cases, is formed of a sandwich type construction wherein there is a top panel which functions as the bottom wall of the freezer compartment, a bottom panel which functions as the top wall of the fresh food compartment, and a rigid plastic foam insulating member between these panels.

Household refrigerators require a number of electrical wires that lead from the rear of the refrigerator to the front of the refrigerator for such things as the light switch and mullion heaters. Many of today's household refrigerators utilize cabinets having foamed plastic walls, such as closed cell polyurethane, as insulation. After this type of insulating material is foamed in place, it is so adherent and rigid that it becomes very difficult during manufacture of the refrigerator cabinet to have any electrical wires passing through the insulating material. Therefore, it is beneficial to be able to have the electrical wires pass through the partition between the freezer compartment and fresh food compartment so that they may be utilized to make the necessary electrical connections at the front of the refrigerator. The partition is a sub-assembly which is later secured inside the refrigerator cabinet. It is desirable that the electrical wires be placed in the sub-assembly partition and have them available for electrical connections after the sub-assembly partition is installed in the refrigerator cabinet. It is also desirable after the partition is installed that the wires can be moved for ease of making the necessary electrical connections.

By our invention there is provided a refrigerator cabinet having a rigid plastic foam member, an electrical wiring assembly and the method of making the same that accomplishes the above-mentioned desirable characteristics.

SUMMARY OF THE INVENTION

According to one aspect of our invention, there is provided a refrigerator cabinet and method of making, said cabinet having a rigid plastic foam member and an electrical wiring assembly. The wiring assembly includes an open channel having opposite side walls and a bottom wall in the rigid plastic foam member and the electrical wires are in the channel. The wiring assembly also includes at least one clip secured within the channel, said clip having two spaced legs with projections formed thereon and gripping respectively the opposite side walls of the channel and a one or two-piece body member depending from the legs spanning the open channel remote from the bottom wall and spaced from the electrical wires. By this construction, the electrical wires are confined within the channel, yet they are allowed longitudinal movement for subsequent assembly purposes.

DESCRIPTION OF THE PREFERRED EMBODIMENT

Figure 1:
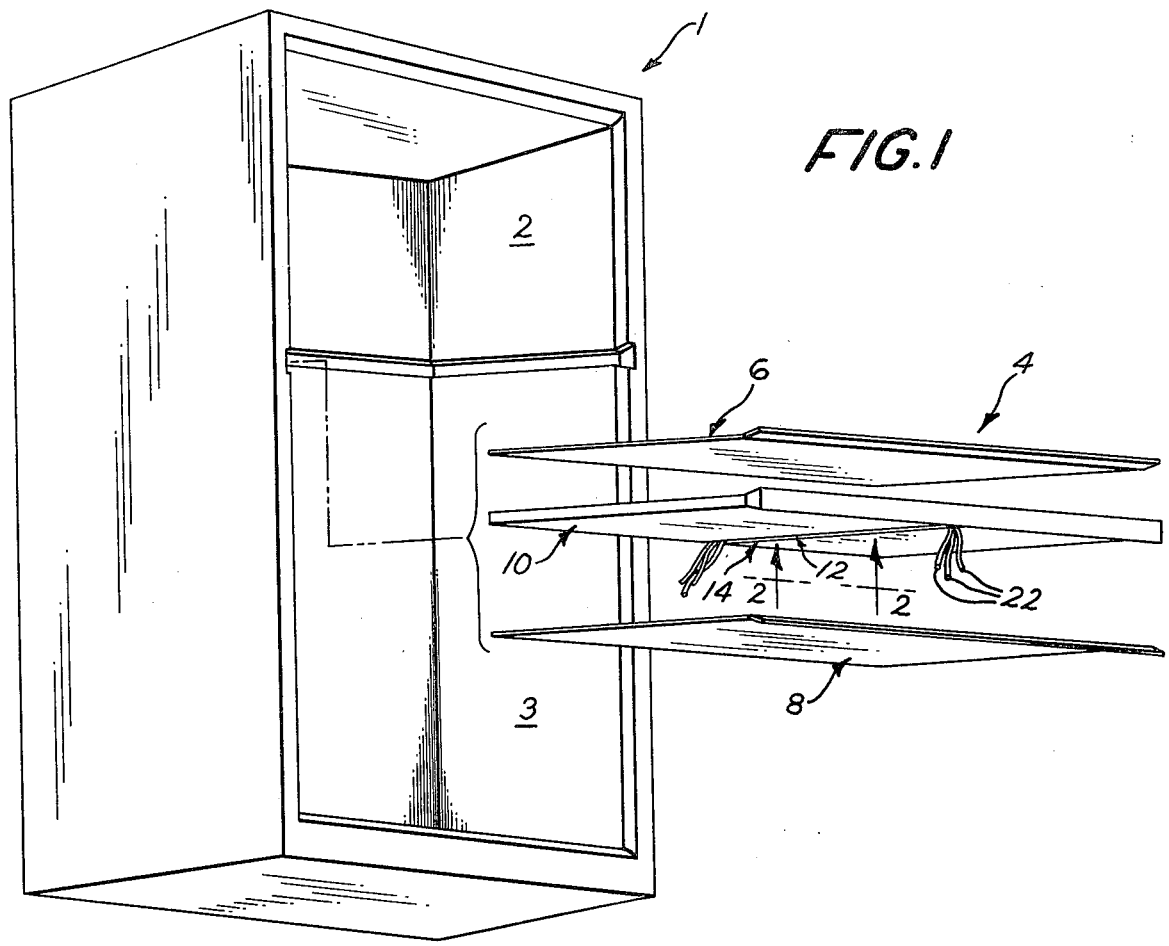
FIG. 1 is a elevational perspective view of a refrigerator cabinet having a freezer compartment on top and a fresh food compartment on the bottom and embodying one form of the present invention.
Figure 2:
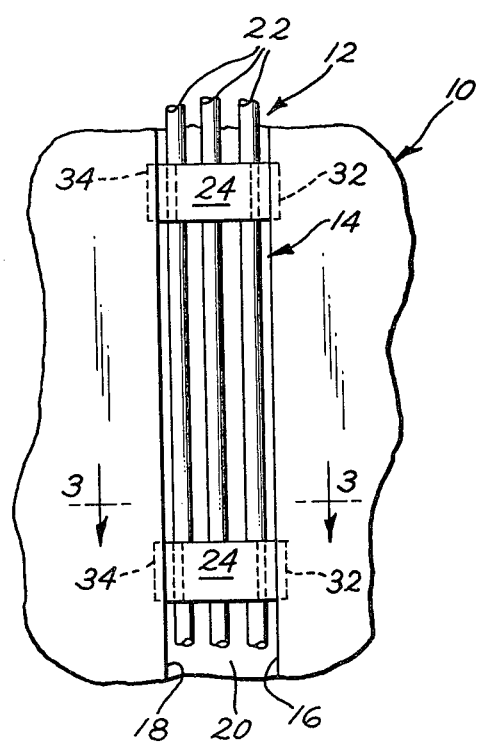
FIG. 2 is a bottom plan view of the present invention taken along Lines 2—2 of FIG. 1.

With particular reference to FIG. 1 of the drawings, there is shown one embodiment of the present invention in the form of a household refrigerator 1, including an upper freezer compartment 2 and a lower fresh food compartment 3 separated from the freezer compartment by an insulating partition 4. The partition 4 is a sandwich composite, including a top panel 6 which is the bottom wall of the freezer compartment 2, and a bottom panel 8 which is the top wall of the fresh food compartment 3 and a rigid plastic foam member 10, such as styrofoam, located between the panels 6 and 8 which acts as an insulation barrier between the freezer compartment 2 and the fresh food compartment 3. The rigid plastic foam member 10 has therethrough an electrical wiring assembly 12. It will be realized that the respective compartments 2 and 3 are also separated from the outer shell or cabinet walls and spaces between the compartments and these walls are filled by means of insulation, such as foamed-in closed cell polyurethane plastic. It will also be understood that hinged doors (not shown) are provided for access to the freezer compartment 2 and fresh food compartment 3.

The electrical wiring assembly 12 includes an open channel 14 having opposite side walls 16 and 18 and a bottom wall 20 formed in the rigid plastic foam member 10. The channel 14 runs from the rear of the refrigerator to the front thereof and has within it the electrical wires 22 necessary for conducting electricity to the front of the refrigerator for such things as the mullion heaters that prevent moisture condensation and a light switch which actuates a light within the refrigerator when the door of the fresh food compartment is opened. The electrical wires 22 are retained within the channel 14 by having at least one clip 24 and, preferably, a plurality of clips spaced relative to each other along the length of the channel and secured within the channel.

Figure 3:
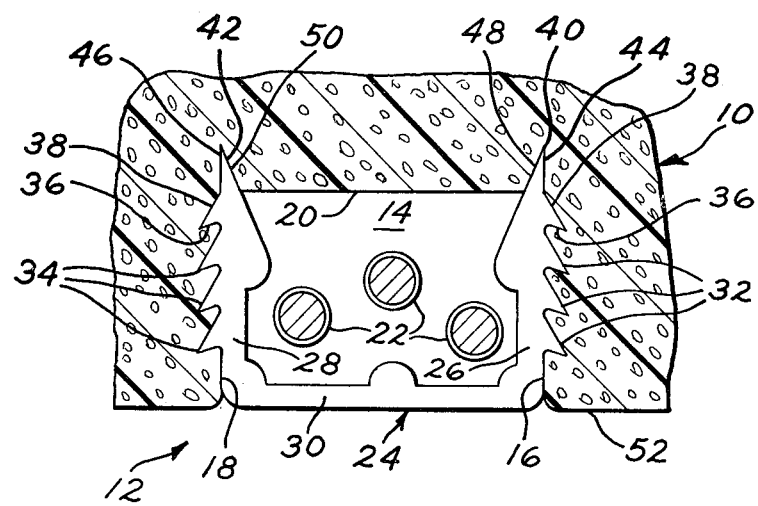
FIG. 3 is a cross sectional view of the present invention taken along Lines 3—3 of FIG. 2.

With particular reference to FIG. 3, one embodiment of the clip 24 is shown. The clip 24 is preferably made of suitable plastic material and includes two spaced legs 26 and 28 and a one-piece body member 30 depending from the legs 26 and 28 spanning the open channel 14 remote from the bottom wall 20 and spaced from the electrical wires 22 to thus confine and yet allow longitudinal movement of the wires 22 within the channel 14. Both of the two legs 26 and 28 of clip 24 have projections 32 and 34, respectively, facing in the direction of the channel 14 side walls 16 and 18 respectively. When the clip 24 is inserted into the channel 14, the projections 32 and 34 of the legs 26 and 28 bite into and grip the rigid plastic foam member 10. The projections 32 and 34 have leading faces 36 sloping gradually upward in a direction toward the channel opening and the trailing faces 38 forming an actute angle with the leading faces 36 so that the projection on both sides of the channel extend into and firmly grip the side walls 16 and 18 of the channel 14. The two spaced legs 26 and 28 of clip 24 have, at their ends opposite the body member 30, free terminal ends 40 and 42, respectively, which are pointed as viewed in lateral cross section, as shown in FIG. 3, and the points of the terminal ends penetrate the body wall 20 of the channel 14. The pointed terminal ends 40 and 42 have an outer surface 44 and 46 parallel to the legs 26 and 28, respectively, and an inner surface 48 and 50 converging toward the outer surfaces 44 and 46, respectively, to form wedge-shaped free terminal ends whereby penetration of the legs 26 and 28 into the bottom wall 20 of the channel 14, when the clip is placed in channel 14, causes the legs 26 and 28 to be urged away from each other. In this manner, the projections 32 and 34 are positively forced into the side walls 16 and 18 respectively of the rigid plastic foam member 10. It will be noted that the clip 24, relative to the height of the channel 14, is such that when the clip 24 is placed within the channel 14, the body member 30 does not extend above the open channel 14. As shown in FIG. 3, the body member 30 is flush with the lower surface 52 of the rigid plastic foam member 10. The reason for this is that when the sandwich composite partition 4 is assembled, the clips should not interfere with a snug-mating fit between the rigid plastic foam member 10 and panel 8. Depending upon the length of the channel 14, it may be desirable to place a plurality of clips 24 within the channel to adequately retain the wires 22 within the channel.

Figure 4:
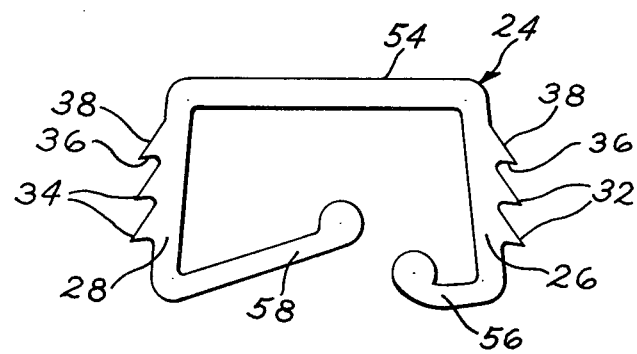
FIG. 4 is a cross sectional elevational view of an alternate embodiment of the clip of the present invention.
Figure 5:
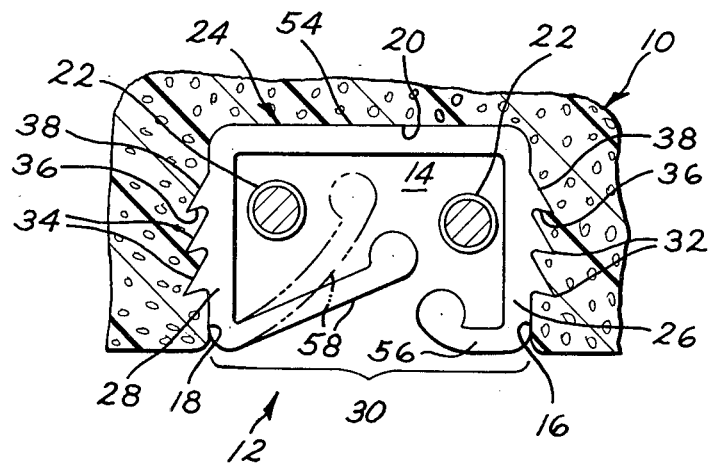
FIG. 5 is a cross sectional view of the present invention, utilizing the alternate embodiment clip shown in FIG. 4.

With particular reference to FIGS. 4 and 5, an alternate embodiment of the clip 24, also preferably made of suitable plastic material, is shown and will now be described. This embodiment of the clip 24 has a second body member 54 depending from the ends of the legs 26 and 28 opposite the first body member 30 and also spans the channel 14. The first body member 30 of the alternate embodiment of the clip 24 is a two-piece member spanning the channel 14 and comprises depending arms 56 and 58 extending inwardly from the respective legs 26 and 28 sufficiently to span the channel 14, as shown in FIG. 5. At least one of the arms 56 and 58 is resilient and movable inwardly relative to the channel 14 to receive through the first body member the electrical wires 22. With reference to FIG. 5, arm 58 may be flexed inwardly, as shown in dotted line, to thus allow the electrical wires 22 to be placed in the channel and the resilient arm 58 will then restore itself to the position shown in full line. The legs 26 and 28 of clip 24 in the alternate embodiment, as shown in FIGS. 4 and 5, also have projections 32 and 34 that function in the same manner as they do in connection with the embodiment of the clip 24 shown in FIG. 3.

In our method of constructing a refrigerator cabinet having a rigid plastic foam member 10, there is provided in the plastic foam member 10 an open channel 14, as previously described. When the clip 24 embodiment shown in FIG. 3 is to be utilized, the electrical wires 22 are placed in the channel 14 and then at least one clip 24 is placed within the channel 14 so that the wedge-shaped free terminal ends 40 and 42 penetrate the bottom wall 20 of the channel 14 and the body member 30 is spaced from the wires 22. By this arrangement, the electrical wires are confined within the channel 14 and yet they may be moved longitudinally along the length of the channel 14 in the space between the bottom wall 20 of the channel 14 and body member 30.

When the clip 24 of the alternate embodiment shown in FIGS. 4 and 5 is to be utilized, at least one clip is first placed within the channel 14 with the second body member 54 abutting the bottom wall 20 of the channel and the first body member, including arms 56 and 58, spanning the channel 14 at its open end. After the clip 24 is placed within the channel 14, the electrical wires 22 are forced through the first body member 30 by flexing inwardly, relative to the channel 14, arm 58 and passing the wires 22 therethrough. It will be noted that the legs 26 and 28 of the clip 24, as shown in FIG. 4, diverge slightly from each other; however, when the clip 24 is placed in the channel 14, the legs are compressed toward each other for insertion in the channel 14. When insertion is complete, the legs 26 and 28 are substantially parallel to each other and the projections 32 and 34 bite into the side walls 16 and 18 of the channel 14.

With the above described refrigerator cabinet construction and method, there is provided an easy-to-assemble structure and particularly when it is a sub-assembled component of a refrigerator and it is efficient for the purposes intended, namely, to retain the electrical wires positively within the structure, yet during final assembly of the refrigerator, the electrical wires may be moved back and forth in the structure so that the proper electrical connections can be easily and quickly made.

The foregoing is a description of the preferred embodiment of the invention and it should be understood that variations may be made thereto without departing from the true spirit of the invention as defined in the appended claims.

What is claimed is:

1. The method of constructing a refrigerator cabinet having electrical wires passing along a rigid plastic foam member comprising:
   forming an open channel having opposite side walls and a bottom wall in the foam member,
   placing the electrical wires in the channel, and
   positioning at least one clip within the channel, said clip having two spaced legs with projections formed thereon gripping respectively the opposite side walls of the channel and a body member depending from the legs spanning the open channel remote from the bottom wall and spaced from the electrical wires to confine and allow longitudinal movement of the wires within the channel.

2. The method of claim 1 wherein the projections on the spaced legs have leading faces sloping gradually upward in a direction toward the channel opening and the trailing faces forming acute angles with the leading faces so that the projections extend into and firmly grip the side walls of the channel upon positioning the clips within the channel.

3. The method of claim 1 wherein the two spaced legs of the clip have, at their respective ends opposite the body member, free terminal ends which are pointed and the points penetrate the bottom wall of the channel upon positioning the clip within the channel.

4. The method of claim 3 wherein the step of placing the electrical wires in the channel is done before the step of positioning the clip within the channel.

5. The method of claim 3 wherein the points of the spaced legs are formed having an outer surface parallel to the leg and an inner surface converging toward the outer surface to form wedge-shaped free terminal ends so that, upon penetration of the legs into the bottom wall of the channel when the clip is positioned within the channel, they are urged away from each other.

6. In a refrigerator cabinet having a rigid plastic foam member, an electrical wiring assembly comprising:
an open channel having opposite side walls and a bottom wall in the rigid plastic foam member;
electrical wires in the channel; and
at least one clip secured within the channel, said clip having two spaced legs with projections formed thereon and gripping respectively the opposite side walls of the channel and a body member depending from the legs spanning the open channel remote from the bottom wall and spaced from the electrical wires to confine and allow longitudinal movement of the wires within the channel.

7. The refrigerator cabinet of claim 6 wherein the projections on the spaced legs have leading faces sloping gradually upward in a direction toward the channel opening and the trailing faces forming an acute angle with the leading faces so that the projections on both sides of the channel extend into and firmly grip the side walls of the channel.

8. The refrigerator cabinet of claim 6 wherein the two spaced legs of the clip have, at their ends opposite the body member, free terminal ends which are pointed and the points penetrate the bottom wall of the channel.

9. The refrigerator cabinet of claim 8 wherein the points of the spaced legs have an outer surface parallel to the leg and an inner surface converging toward the outer surface to form wedge-shaped free terminal ends whereby penetration of the legs into the bottom wall of the channel cause the legs to be urged away from each other.

10. The refrigerator cabinet of claim 6 wherein the cabinet has a freezer compartment and a fresh food compartment and the rigid plastic foam member is located within a partition separating the compartments.

11. The refrigerator cabinet of claim 10 wherein the freezer compartment is located above the fresh food compartment.

12. The refrigerator cabinet of claim 11 wherein the partition is a sandwich composite comprised of a top panel and a bottom panel with the rigid plastic foam member therebetween.

13. The refrigerator cabinet of claim 6 wherein the rigid plastic foam member is styrofoam.

* * * * *